United States Patent
Zhu et al.

(10) Patent No.: US 11,259,336 B2
(45) Date of Patent: Feb. 22, 2022

(54) COMMUNICATIONS METHOD, APPARATUS, AND SYSTEM

(71) Applicant: HUAWEI TECHNOLOGIES CO., LTD., Shenzhen (CN)

(72) Inventors: Yuanping Zhu, Shanghai (CN); Rui Wang, Shanghai (CN); Mingzeng Dai, Shanghai (CN); Xiaoli Shi, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/875,709

(22) Filed: May 15, 2020

(65) Prior Publication Data

US 2020/0296769 A1   Sep. 17, 2020

Related U.S. Application Data

(63) Continuation of application No. PCT/CN2018/115090, filed on Nov. 12, 2018.

(30) Foreign Application Priority Data

Nov. 17, 2017 (CN) .......................... 201711145853.4

(51) Int. Cl.
*H04W 74/08* (2009.01)
*H04W 48/10* (2009.01)
(Continued)

(52) U.S. Cl.
CPC ....... *H04W 74/0833* (2013.01); *H04W 48/10* (2013.01); *H04W 72/005* (2013.01); *H04W 92/20* (2013.01)

(58) Field of Classification Search
CPC .. H04B 7/15528; H04W 48/02; H04W 48/10; H04W 74/0833
See application file for complete search history.

(56) References Cited

U.S. PATENT DOCUMENTS

2006/0166618 A1* 7/2006 Bakaimis ............... H04B 7/155
455/11.1
2008/0267113 A1* 10/2008 Lim ...................... H04B 7/2606
370/315

(Continued)

FOREIGN PATENT DOCUMENTS

| CN | 101938775 A | 1/2011 |
|---|---|---|
| CN | 102396167 A | 3/2012 |

(Continued)

OTHER PUBLICATIONS

Liu et al., "Discussion on LTE-NR Dual Connection Technique," Mobile Communications, Total 9 pages (2017). with English Abstract.

(Continued)

*Primary Examiner* — Gary Mui
(74) *Attorney, Agent, or Firm* — Leydig, Voit & Mayer, Ltd.

(57) ABSTRACT

This application provides a communications method, apparatus, and system, aiming to improve a capacity of a 5G network. The system includes a first access network device, a second access network device, a terminal, and an RN, where the terminal is connected to the first access network device by the RN, the terminal is further connected to the second access network device, the terminal receives signaling and/or data from the second access network device, and the terminal further receives data from the first access network device by the RN. This application relates to the field of communications technologies.

8 Claims, 6 Drawing Sheets

(51) Int. Cl.
*H04W 72/00* (2009.01)
*H04W 92/20* (2009.01)

(56) References Cited

U.S. PATENT DOCUMENTS

| | | | | |
|---|---|---|---|---|
| 2010/0272017 | A1* | 10/2010 | Terry | H04W 48/12 |
| | | | | 370/328 |
| 2010/0273416 | A1 | 10/2010 | Yi et al. | |
| 2011/0222428 | A1* | 9/2011 | Charbit | H04W 16/26 |
| | | | | 370/252 |
| 2011/0263239 | A1* | 10/2011 | Yamagishi | H04W 48/18 |
| | | | | 455/418 |
| 2011/0268048 | A1 | 11/2011 | Toskala et al. | |
| 2017/0289969 | A1 | 10/2017 | Zhou et al. | |
| 2019/0082040 | A1* | 3/2019 | Aziz | H04L 69/324 |
| 2020/0045626 | A1* | 2/2020 | Kim | H04W 40/22 |
| 2020/0205097 | A1* | 6/2020 | Wu | H04W 52/0251 |

FOREIGN PATENT DOCUMENTS

| | | |
|---|---|---|
| CN | 102948103 A | 2/2013 |
| CN | 103597756 A | 2/2014 |
| CN | 104937976 A | 9/2015 |
| CN | 104969653 A | 10/2015 |
| CN | 106550490 A | 3/2017 |
| CN | 106793097 A | 5/2017 |
| CN | 107087442 A | 8/2017 |
| EP | 2237578 A2 | 10/2010 |
| EP | 2351401 A1 | 8/2011 |
| WO | 2010034349 A1 | 4/2010 |
| WO | 2010057521 A1 | 5/2010 |
| WO | 2017126945 A1 | 7/2017 |

OTHER PUBLICATIONS

Rosa et al., "Dual Connectivity for LTE Small Cell Evolution: Functionality and Performance Aspects," IEEE Communications Magazine, vol. 54, No. 6, pp. 137-143, Institute of Electrical and Electronics Engineers, New York, New York (Jun. 2016).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.0.0, pp. 1-254, 3rd Generation Partnership Project, Valbonne, France (Jun. 2015).
"3rd Generation Partnership Project; Technical Specification Group Radio Access Network; Study on new radio access technology: Radio access architecture and interfaces (Release 14)," 3GPP TR 38.801 V14.0.0, pp. 1-91, 3rd Generation Partnership Project, Valbonne, France (Mar. 2017).
"Considerations on 5G relay requirements," 3GPP TSG RAN ad hoc, RPa160076 Revision of RPa160054, Barcelona, Spain, pp. 1-4, 3rd Generation Partnership Project, Valbonne, France (Jan. 28-29, 2016).
"3rd Generation Partnership Project; Technical Specification Group Services and System Aspects; Service requirements for the 5G system; Stage 1 (Release 16)," 3GPP TS 22.261 V16.1.0, pp. 1-52, 3rd Generation Partnership Project, Valbonne, France (Sep. 2017).
"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V1.2.1, pp. 1-49, 3rd Generation Partnership Project, Valbonne, France (Nov. 2017).
"3rd Generation Partnership Project; Technical Specification Group Radio Access Network; NR; Radio Resource Control (RRC); Protocol specification (Release 15)," 3GPP TS 38.331 V0.1.0, pp. 1-42, 3rd Generation Partnership Project, Valbonne, France (Oct. 2017).
"3rd Generation Partnership Project; Technical Specification Group Radio Access Network; New Generation Radio Access Network; User Equipment (UE) procedures in Idle mode (Release 15)," 3GPP TS 38.304 v0.0.6, pp. 1-12, 3rd Generation Partnership Project, Valbonne, France (Nov. 2017).

* cited by examiner

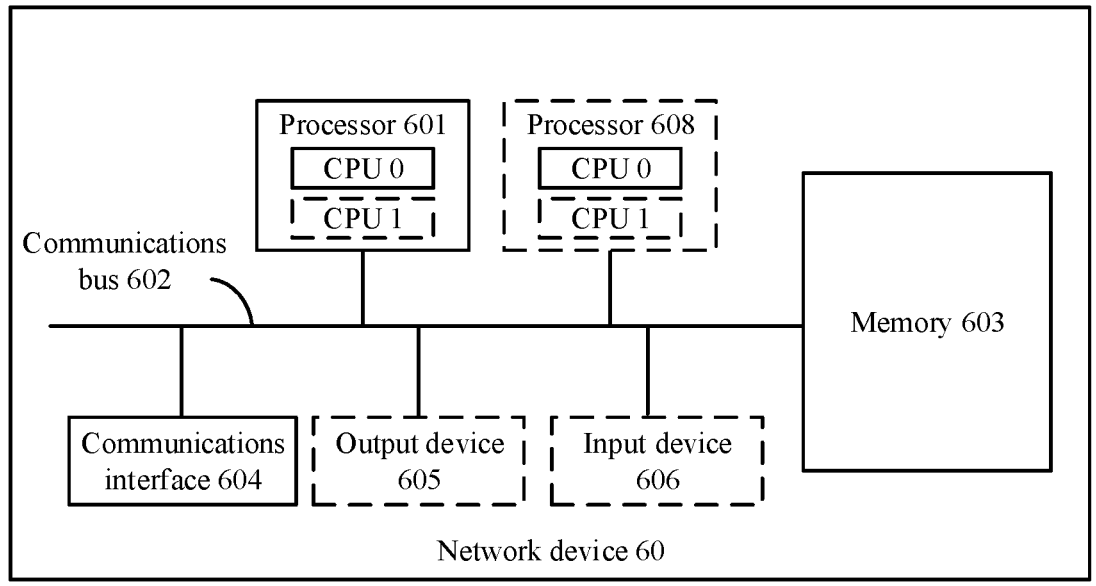
FIG. 6
A first RN obtains first indication information, where the first indication information indicates that the RN is allowed to access a cell covered by a first access network device — 701
The first RN initiates random access to the first access network device based on the first indication information — 702
FIG. 7
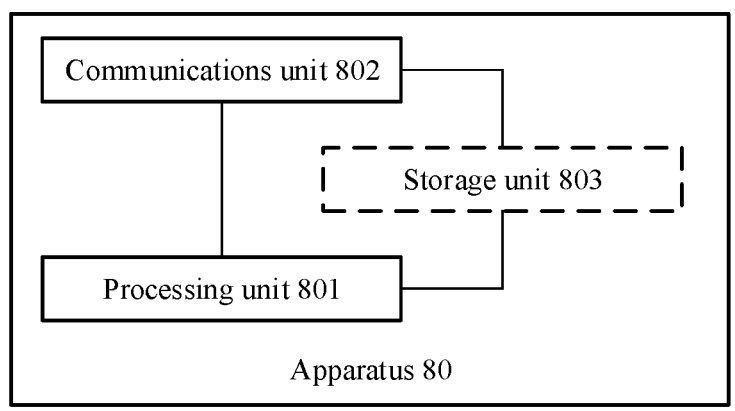
FIG. 8

COMMUNICATIONS METHOD, APPARATUS, AND SYSTEM

CROSS-REFERENCE TO RELATED APPLICATIONS

This application is a continuation of International Application No. PCT/CN2018/115090, filed on Nov. 12, 2018, which claims priority to Chinese Patent Application No. 201711145853.4, filed on Nov. 17, 2017. The disclosures of the aforementioned applications are hereby incorporated by reference in their entireties.

TECHNICAL FIELD

Embodiments of this application relate to the field of communications technologies, and in particular, to a communications method, apparatus, and system.

BACKGROUND

As technologies such as virtual reality (VR), augmented reality (AR), and the internet of things develop, there is an increasing quantity of terminals in a future network, and a usage volume of network data also continuously increases. To collaborate with the increasing quantity of terminals and the extremely rapid growth of the network data usage volume in the market, a higher requirement is currently raised on a capacity of a 5th generation (5G) wireless communications system. In a hotspot area, to meet a 5G ultra-high capacity requirement, using high-frequency small cells for networking is more popular. High-frequency carriers have a poor propagation characteristic, are severely attenuated by obstacles, and have a small coverage. Consequently, a large quantity of small cells need to be deployed densely in the hotspot area. These small cells may be relay nodes (RN).

Currently, in a process of 5G network standardization, a non-standalone (NSA) networking scenario in which a terminal performs dual connectivity (DC) in the long term evolution (LTE) access standard and the 5G new radio (NR) access standard is discussed. An air interface corresponding to the LTE access standard is an evolved universal terrestrial radio access (E-UTRA) air interface, so that the terminal obtains radio resources from both the E-UTRA air interface and an NR air interface to perform data transmission, to obtain a gain of a transmission rate. LTE-NR dual connectivity has a plurality of backup architectures. For one of the architectures, refer to FIG. 1. A core network is an evolved packet core (EPC) network, or a new generation core (NGC) network/5G core (5GC) network. An evolved NodeB (eNB) that provides an LTE access standard service is used as a primary base station, and a control plane connection and a user plane connection may be established, for a terminal, between the primary base station and the core network. A next generation NodeB (gNB) in 5G that provides an NR access standard service is used as a secondary base station, and only a user plane connection can be established, for the terminal, between the secondary base station and the core network.

In the NSA networking scenario shown in FIG. 1, the gNB cannot provide a control plane connection for the terminal. Therefore, the gNB adds indication information (for example, "cell barred flag") to broadcast information sent by the gNB, to indicate, to the terminal, that initial access cannot be performed in a cell covered by the gNB. After reading the indication information, the terminal does not camp on the cell covered by the gNB. In this case, when initially accessing a network, an RN accesses the network by an identity of a terminal. After identifying the indication information, the RN does not access the cell covered by the gNB. Consequently, the RN cannot be connected to the gNB to provide a network access service for the terminal, and improvement of a 5G network capacity is limited.

SUMMARY

Embodiments of this application provide a communications method, apparatus, and system, aiming to improve a capacity of a 5G network.

To achieve the foregoing objective, the embodiments of this application provide the following technical solutions.

According to a first aspect, a communications system is provided. The communications system includes: a first access network device, a second access network device, a terminal, and an RN, where the terminal is connected to the first access network device by the RN, the terminal is further connected to the second access network device, the terminal receives signaling and/or data from the second access network device, and the terminal further receives data from the first access network device by the RN. According to the communications system provided in the first aspect, the terminal may be connected to the first access network device by the RN. When the communications system is applied to a 5G network, because the RN is deployed, a capacity of the 5G network can be improved, and a coverage can be expanded.

In a possible design, the first access network device is a base station whose access standard is the NR standard, and the second access network device is a base station whose access standard is the LTE standard.

According to a second aspect, a communications method is provided. The communications method includes: sending, by a first access network device, first indication information to a first RN, where the first indication information indicates that the RN is allowed to access a cell covered by the first access network device; and the RN that accesses the cell covered by the first access network device is configured to provide a data transmission service for a terminal, the terminal is configured to establish a connection to the first access network device by the RN that accesses the cell covered by the first access network device, and the terminal is further configured to: establish a connection to a second access network device, and receive signaling and/or data from the second access network device. According to the method provided in the second aspect, the first access network device may send the first indication information to the RN, so that the RN is enabled to access the first access network device. When the method is applied to the application scenario shown in FIG. 1, the RN is enabled to access the gNB, and the gNB can provide a data transmission service for the terminal by the RN. In this way, dual connectivity of the terminal can be implemented, and the RN can be deployed in a 5G network, and therefore, a capacity of the 5G network is improved.

In a possible design, the first indication information includes at least one of information indicating that the RN is allowed to access the cell covered by the first access network device and a random access resource to be used by the RN to access the cell covered by the first access network device. NSA is a networking mode that is very likely to be used at an initial stage of 5G network deployment. This possible design enables the RN to access the gNB in NSA networking, and therefore, the capacity of the 5G network is improved.

In a possible design, the first indication information is included in a broadcast message. In this possible design, the first access network device may conveniently send the first indication information to the first RN by the broadcast message.

In a possible design, the broadcast message further includes second indication information, and the second indication information indicates that the terminal is not allowed to access the cell covered by the first access network device. This possible design can be compatible with an existing protocol version, so that the terminal is prevented from camping on the cell covered by the first access network device.

In a possible design, the first access network device is a base station whose access standard is the NR standard, and the second access network device is a base station whose access standard is the LTE standard.

According to a third aspect, a communications method is provided. The communications method includes: obtaining, by a first RN, first indication information, where the first indication information indicates that the RN is allowed to access a cell covered by a first access network device; and initiating, by the first RN, random access to the first access network device based on the first indication information, where the RN that accesses the cell covered by the first access network device is configured to provide a data transmission service for a terminal, the terminal is configured to establish a connection to the first access network device by the RN that accesses the cell covered by the first access network device, and the terminal is further configured to: establish a connection to a second access network device, and receive signaling and/or data from the second access network device. According to the method provided in the third aspect, the RN may access the first access network device by the first indication information. When the method is applied to the application scenario shown in FIG. 1, the RN is enabled to access the gNB, and the gNB can provide a data transmission service for the terminal by the RN. In this way, dual connectivity of the terminal can be implemented, and the RN can be deployed in a 5G network, and therefore, a capacity of the 5G network is improved.

In a possible design, the first indication information includes at least one of information indicating that the RN is allowed to access the cell covered by the first access network device and a random access resource to be used by the RN to access the cell covered by the first access network device.

In a possible design, the first indication information includes at least the random access resource to be used by the RN to access the cell covered by the first access network device, and the initiating, by the first RN, random access to the first access network device based on the first indication information includes: initiating, by the first RN, random access to the first access network device by the random access resource indicated by the first indication information.

In a possible design, the obtaining, by a first RN, first indication information includes: receiving, by the first RN, a broadcast message from the first access network device, where the broadcast message includes the first indication information, and obtaining, by the first RN, the first indication information based on the broadcast message; or establishing, by the first RN, a connection to the second access network device, and obtaining the first indication information from the second access network device. In this possible design, the first RN may conveniently receive the first indication information.

In a possible design, the broadcast message further includes second indication information, and the second indication information indicates that the terminal is not allowed to access the cell covered by the first access network device. This possible design can be compatible with an existing protocol version, so that the terminal is prevented from camping on the cell covered by the first access network device.

In a possible design, the first access network device is a base station whose access standard is the NR standard, and the second access network device is a base station whose access standard is the LTE standard.

According to a fourth aspect, a communications apparatus is provided. The apparatus has a function for implementing any method provided in the second aspect or the third aspect. The function may be implemented by hardware, or may be implemented by hardware executing corresponding software. The hardware or the software includes one or more units corresponding to the function. The apparatus may exist in a product form of a chip.

According to a fifth aspect, a communications apparatus is provided. The apparatus includes a memory and a processor, where the memory is configured to store a computer executable instruction, and the processor executes the computer executable instruction stored in the memory, so that the apparatus is enabled to implement any method provided in the second aspect or the third aspect. The apparatus may exist in a product form of a chip.

According to a sixth aspect, a computer-readable storage medium is provided. The computer-readable storage medium includes an instruction, and when the instruction is run on a computer, the computer is enabled to perform any method provided in the second aspect or the third aspect.

According to a seventh aspect, a computer program product including an instruction is provided. When the computer program product is run on a computer, the computer is enabled to perform any method provided in the second aspect or the third aspect.

For technical effects brought by any design in the fourth aspect to the seventh aspect, refer to technical effects brought by different designs in the second aspect or the third aspect. Details are not described herein again.

BRIEF DESCRIPTION OF DRAWINGS

FIG. 6 is a schematic composition diagram of a network device according to an embodiment of this application;

FIG. 7 is a flowchart of a communications method according to an embodiment of this application; and FIG. 8 is a schematic composition diagram of an apparatus according to an embodiment of this application.

DESCRIPTION OF EMBODIMENTS

The following describes technical solutions in embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of this application, "a plurality of" means two or more than two.

It should be noted that the RN in the embodiments of this application may be replaced with an integrated access and backhaul (IAB) node.

Figure 2:
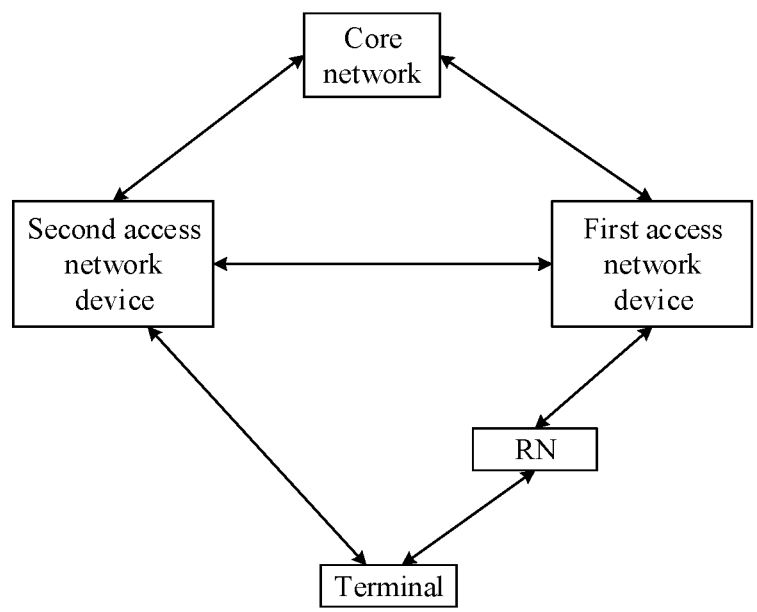
FIG. 2 is a schematic composition diagram of a network architecture according to an embodiment of this application.

An embodiment of this application provides a communications system. As shown in FIG. 2, the system includes: a first access network device, a second access network device, a terminal, and an RN, where the terminal is connected to the first access network device by the RN, the terminal is further connected to the second access network device, the terminal receives signaling and/or data from the second access network device, and the terminal further receives data from the first access network device by the RN. In addition, the terminal may further send data to the first access network device, and send signaling and/or data to the second access network device.

Referring to FIG. 2, the terminal may access a network by the first access network device and the second access network device. The first access network device may provide a user plane connection for the terminal, the second access network device may provide a user plane connection and a control plane connection for the terminal, and the first access network device and the second access network device may provide a network service for the terminal at the same time. In this case, the first access network device is a secondary base station, and the second access network device is a primary base station.

Figure 3:
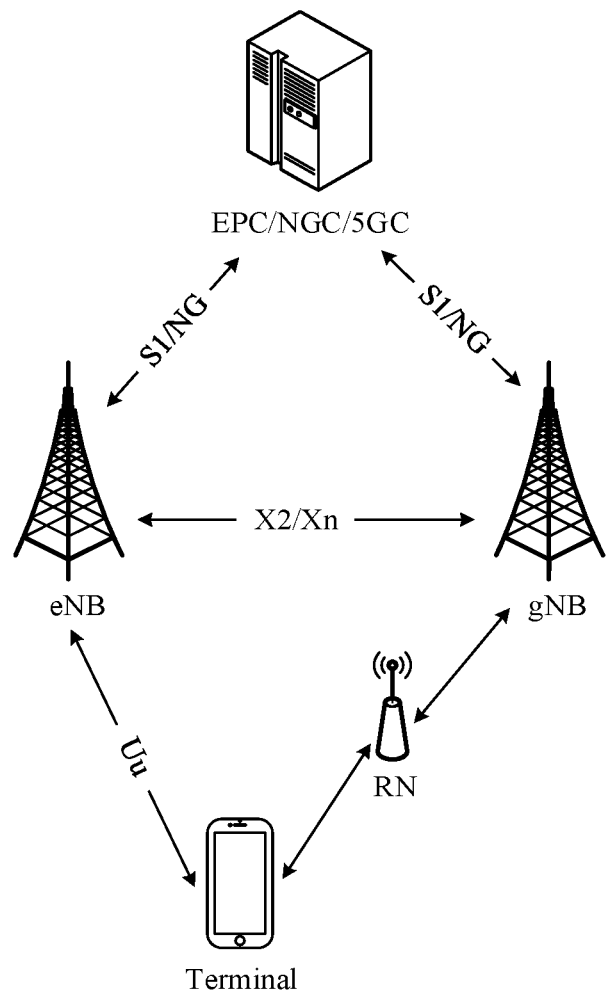
FIG. 3 is a schematic composition diagram of another network architecture according to an embodiment of this application.

Optionally, as shown in FIG. 3, the first access network device is a base station whose access standard is the NR standard, and the second access network device is a base station whose access standard is the LTE standard.

Referring to FIG. 3, the base station whose access standard is the NR standard may be a gNB, and the base station whose access standard is the LTE standard may be an eNB, where the eNB includes, for example, an LTE eNB connected to an EPC, and an NG eNB connected to a 5GC/NGC. The core network may be an EPC/an NGC/a 5GC. The terminal may communicate with the eNB by a Uu interface, the eNB and the gNB may communicate with each other by an X2/Xn interface, and the gNB and the eNB may communicate with the core network by an S1/NG interface. The terminal obtains radio resources from both an LTE air interface and an NR air interface to perform data transmission, to obtain a gain of a transmission rate. It should be noted that in the NSA networking scenario, when the RN is replaced with an IAB node, a gNB that provides a backhaul service for the IAB node may be referred to as an "IAB donor gNB".

Figure 4:
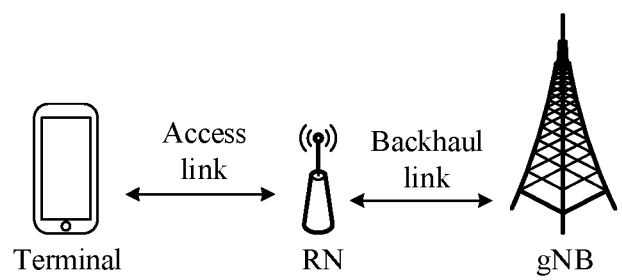
FIG. 4 is a schematic diagram in which a terminal is connected to a base station by an RN according to an embodiment of this application.

For example, referring to FIG. 4, the RN is connected to the gNB by a backhaul link (BL), and some or all functions of a core network element serving the RN may also be deployed inside the gNB. The terminal is connected to the RN by an access link (AL), and then accesses the network. A backhaul link based on the NR standard may be established between the RN and the gNB, and an access link based on a standard such as LTE, NR, or wireless local area network (WLAN) may be established between the terminal and the RN.

When the RN is deployed in a hotspot area, if optical fiber transmission is used, there are problems such as high costs and a high construction difficulty. Therefore, data transmission can be performed between the terminal and the RN and between the RN and the gNB in a wireless manner, so that the problems of high costs and a high construction difficulty that are caused by optical fiber deployment between the RN and the gNB are avoided. Further, integrated access and backhaul (IAB) in the 5G network is implemented.

Figure 5:
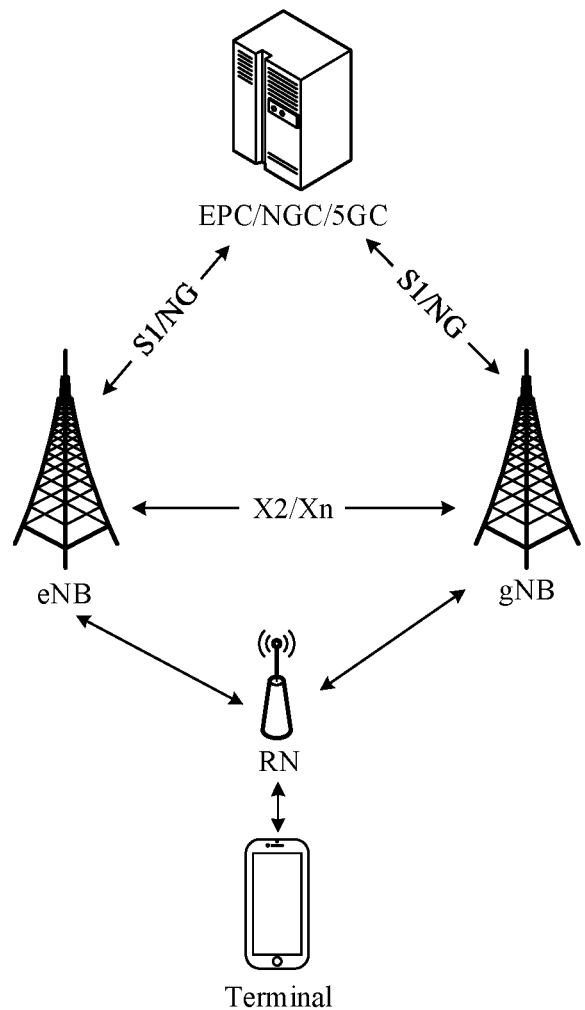
FIG. 5 is a schematic composition diagram of another network architecture according to an embodiment of this application.
Figure 5A:
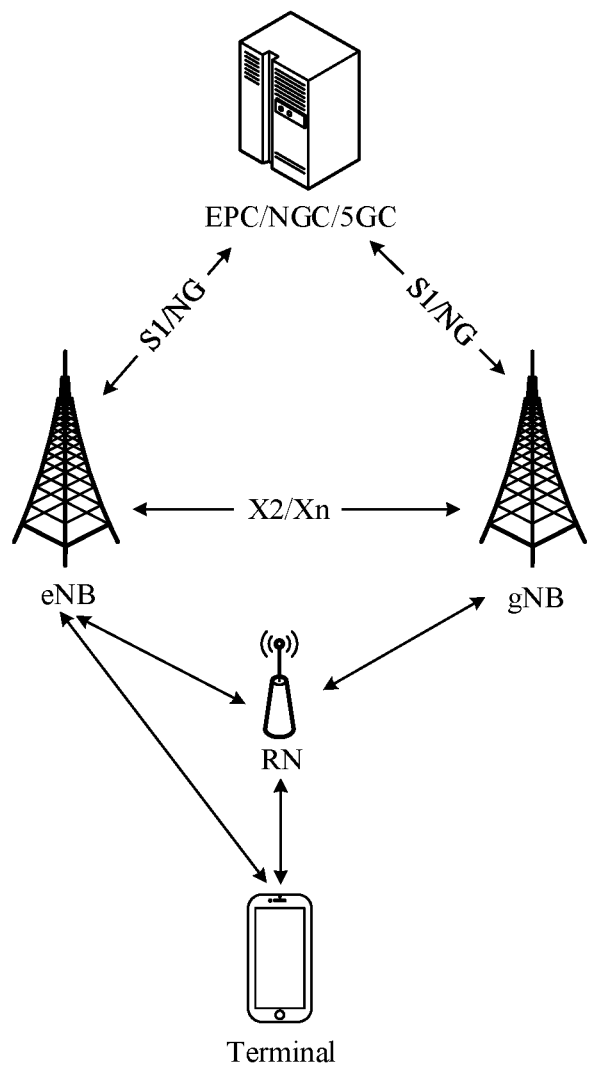
FIG. 5a is a schematic composition diagram of another network architecture according to an embodiment of this application.

Optionally, referring to FIG. 5, the terminal may alternatively be connected to the second access network device by the RN. In this case, the RN establishes dual connections to the first access network device and the second access network device. The terminal receives data from the first access network device by the RN, and receives signaling and/or data from the second access network device by the RN. The terminal may further send data to the first access network device by the RN, and send signaling and/or data to the second access network device by the RN.

Optionally, referring to FIG. 5, the terminal may be further connected to the second access network device based on a connection relationship of network elements shown in FIG. 5. In this case, the RN establishes dual connections to the first access network device and the second access network device. The terminal establishes dual connections to the RN and the second access network device. The terminal receives data from the first access network device by the RN, and receives, directly or by the RN, signaling and/or data from the second access network device. The terminal may further send data to the first access network device by the RN, and send, directly or by the RN, signaling and/or data to the second access network device.

It should be noted that, in this embodiment of this application, interfaces for interaction between the network elements shown in FIG. 3 and FIG. 5 may be the interfaces shown in the figures, or may be other interfaces that can enable interaction between the network elements. This is not specifically limited in this embodiment of this application.

According to the communications system provided in this embodiment of this application, the terminal may be connected to the first access network device by the RN. When the communications system is applied to a 5G network, because the RN is deployed, a capacity of the 5G network can be improved, and a coverage can be expanded.

As shown in FIG. 6, an embodiment of this application provides a schematic diagram of a hardware structure of a network device 60. The network device 60 includes at least one processor 601, a communications bus 602, a memory 603, and at least one communications interface 604. The network device 60 may be an access network device or an RN.

The processor 601 may be a general-purpose CPU, a microprocessor, an application-specific integrated circuit (ASIC), or one or more integrated circuits configured to control program execution of the solutions in this application.

The communications bus 602 may include a path for transmitting information between the foregoing components.

The communications interface 604 may be any apparatus such as a transceiver, and is configured to communicate with another device or a communications network, such as the ethernet, a radio access network (RAN), or a WLAN.

The memory 603 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of an instruction or a data structure and capable of being accessed by a computer, but is not limited thereto. The memory may exist independently, and is connected to the processor by the bus. The memory may be integrated with the processor.

The memory 603 is configured to store application program code for executing the solutions in this application, and the processor 601 controls the execution. The processor 601 is configured to execute the application program code stored in the memory 603, to implement the method provided in the following embodiments of this application.

During specific implementation, in an embodiment, the processor 601 may include one or more CPUs, for example, a CPU 0 and a CPU 1 in FIG. 6.

During specific implementation, in an embodiment, the network device 60 may include a plurality of processors, for example, the processor 601 and a processor 608 in FIG. 6. Each of the processors may be a single-core (single-CPU) processor or a multi-core (multi-CPU) processor. The processor herein may be one or more devices, circuits, and/or processing cores for processing data (for example, a computer program instruction).

During specific implementation, in an embodiment, the network device 60 may further include an output device 605 and an input device 606.

Figure 1:
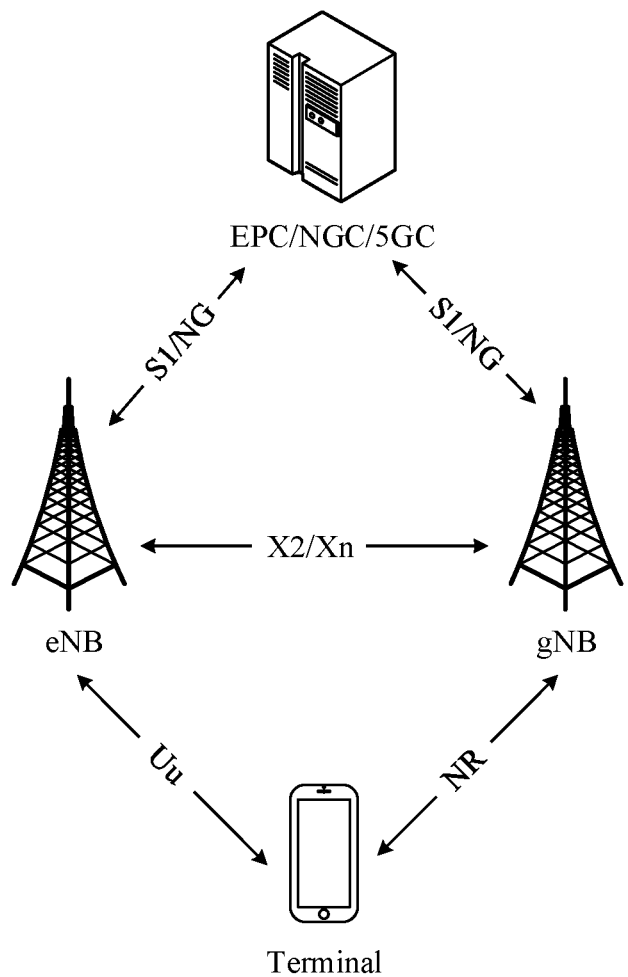
FIG. 1 is a schematic composition diagram of a network architecture in the prior art.

In the network architecture shown in FIG. 1, although the gNB cannot provide a control plane connection for the terminal, the terminal is not allowed to camp on the cell covered by the gNB, and the gNB does not provide a random access resource for the terminal, the RN still needs to access the gNB. Therefore, an embodiment of this application further provides a communications method. As shown in FIG. 7, the method includes the following steps.

701: A first RN obtains first indication information, where the first indication information indicates that the RN is allowed to access a cell covered by a first access network device.

Optionally, the first indication information includes at least one of information indicating that the RN is allowed to access the cell covered by the first access network device and a random access resource to be used by the RN to access the cell covered by the first access network device. NSA is a networking mode that is very likely to be used at an initial stage of 5G network deployment. This optional method enables the RN to access the gNB in NSA networking, and therefore, a capacity of the 5G network is improved.

When the first indication information includes the information indicating that the RN is allowed to access the cell covered by the first access network device, the first indication information directly indicates that the first access network device allows the RN to access the cell covered by the first access network device. When the first indication information includes only the random access resource to be used by the RN to access the cell covered by the first access network device, the first indication information indirectly indicates that the first access network device allows the RN to access the cell covered by the first access network device.

It should be noted that in the network architecture shown in FIG. 1, the gNB cannot provide the random access resource for the RN. Therefore, in this embodiment of this application, the first indication information may indicate the random access resource to be used by the RN to access the cell covered by the first access network device. In this case, the first indication information may include or may not include the information indicating that the RN is allowed to access the cell covered by the first access network device. Certainly, the random access resource to be used by the RN to access the cell covered by the first access network device may alternatively be statically or semi-statically configured for the RN. In this case, the first indication information may include only the information indicating that the RN is allowed to access the cell covered by the first access network device.

Optionally, during specific implementation, step 701 may be implemented in any one of the following manners.

Manner 1: The first access network device sends the first indication information to the first RN, and the first RN receives the first indication information from the first access network device.

Optionally, the first indication information may be included in a broadcast message. In this case, the first access network device sends the broadcast message to the first RN, and the first RN receives the broadcast message from the first access network device. The broadcast message includes the first indication information, and the first RN obtains the first indication information based on the broadcast message. The first access network device may conveniently send the first indication information to the first RN by the broadcast message.

Optionally, the broadcast message may further include second indication information, and the second indication information indicates that the terminal is not allowed to access the cell covered by the first access network device. In this case, after receiving the broadcast message, the first RN ignores the second indication information in the broadcast message, and performs a corresponding operation based on the first indication information. This optional method can be compatible with an existing protocol version, so that the terminal is prevented from camping on the cell covered by the first access network device.

Manner 2: The first RN establishes a connection to a second access network device, and obtains the first indication information from the second access network device.

Specifically, when initiating random access to the second access network device, the first RN may indicate an RN identity of the first RN to the second access network device. Specifically, the first RN may send an RN identifier to the second access network device. After receiving the RN identifier, the second access network device may send, to the first RN, cell information of the gNB that can serve the first RN and the random access resource, namely, the first indication information.

After obtaining the first indication information, the first RN may be disconnected from the second access network device, or may not be disconnected from the second access network device. If the first RN is not disconnected from the second access network device, after the first RN establishes the connection to the first access network device, the first access network device and the second access network device communicate with the RN in a dual connectivity mode, to provide a service for the first RN. In this case, the terminal may be further connected to the second access network device by an RN. For details, refer to FIG. 5. The terminal receives data from the first access network device by the RN, and receives signaling and/or data from the second access network device by the RN. The terminal further sends data to the first access network device by the RN, and sends signaling and/or data to the second access network device by the RN.

702: The first RN initiates random access to the first access network device based on the first indication information.

The RN that accesses the cell covered by the first access network device is configured to provide a data transmission service for the terminal, the terminal is configured to establish a connection to the first access network device by the RN that accesses the cell covered by the first access network device, and the terminal is further configured to: establish a connection to the second access network device, and receive signaling and/or data from the second access network device. In addition, the terminal further sends data to the first access network device, and sends signaling and/or data to the second access network device. Referring to FIG. 5, the terminal may alternatively be connected to the second access network device by the RN.

Optionally, the first indication information includes at least the random access resource to be used by the RN to access the cell covered by the first access network device, and during specific implementation, the step 702 may include: the first RN initiates random access to the first access network device by the random access resource indicated by the first indication information.

Optionally, the first access network device is a base station whose access standard is the NR standard, and the second access network device is a base station whose access standard is the LTE standard. For descriptions of this part, refer to the foregoing descriptions. Details are not described herein again.

After the first RN accesses the first access network device, for a network architecture, refer to FIG. 2, FIG. 3, or FIG. 5.

For example, referring to FIG. 4, the RN is connected to the gNB by a backhaul link, and some or all functions of a core network element serving the RN may also be deployed inside the gNB. The terminal is connected to the RN by an access link, and then accesses the network. A backhaul link based on the NR standard may be established between the RN and the gNB, and an access link based on a standard such as LTE, NR, or WLAN may be established between the terminal and the RN.

When the RN is deployed in a hotspot area, if optical fiber transmission is used, there are problems such as high costs and a high construction difficulty. Therefore, data transmission can be performed between the terminal and the RN and between the RN and the gNB in a wireless manner, so that the problems of high costs and a high construction difficulty that are caused by optical fiber deployment between the RN and the gNB are avoided. Further, IAB in the 5G network is implemented.

According to the method provided in this embodiment of this application, the first access network device may send the first indication information to the RN, so that the RN is enabled to access the first access network device. When the method is applied to the application scenario shown in FIG. 1, the RN is enabled to access the gNB, and the gNB can provide a data transmission service for the terminal by the RN. In this way, dual connectivity of the terminal can be implemented, and the RN can be deployed in the 5G network, and therefore, a capacity of the 5G network is improved.

The foregoing mainly describes the solutions provided in the embodiments of this application from a perspective of the methods. It may be understood that, to implement the foregoing functions, the foregoing access network device and/or the RN include corresponding hardware structures and/or software modules performing the functions. A person skilled in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, function modules in the access network device and/or the RN may be obtained through division based on the foregoing method examples. For example, each function module corresponding to each function may be obtained through division, or two or more functions may be integrated into one processing module. The integrated module may be implemented in a form of hardware, or may be implemented in a form of a software functional module. It should be noted that, in this embodiment of this application, module division is an example, and is merely logical function division. During actual implementation, another division manner may be used.

For example, FIG. 8 is a possible schematic structural diagram of an apparatus 80 in the foregoing embodiments. The apparatus 80 includes a processing unit 801 and a communications unit 802, and may further include a storage unit 803. The apparatus 80 may be a first access network device or a first RN.

When the apparatus 80 is the first access network device, the processing unit 801 is configured to control and manage an action of the first access network device. Specifically, the processing unit 801 is configured to support the first access network device in performing an action performed by the first access network device described in the embodiments of this application. The communications unit 802 is configured to support the first access network device in communicating with another network entity, for example, communicating with the first RN. The storage unit 803 is configured to store program code and data of the first access network device.

When the apparatus 80 is the first RN, the processing unit 801 is configured to control and manage an action of the first RN. For example, the processing unit 801 is configured to support the first RN in performing the steps in FIG. 7 and/or an action performed by the first RN in another process described in the embodiments of this application. The communications unit 802 is configured to support the first RN in communicating with another network entity, for example, communicating with the first access network device. The storage unit 803 is configured to store program code and data of the first RN.

The processing unit 801 may be a processor or a controller. The communications unit 802 may be a communications interface, a transceiver, a transceiver circuit, or the like, where the communications interface is a general term, and may include one or more interfaces. The storage unit 803 may be a memory. When the processing unit 801 is a processor, the communications unit 802 is a communications interface, and the storage unit 803 is a memory, the apparatus 80 according to the embodiments of this application may be the network device 60 shown in FIG. 6.

When the network device 60 is the first access network device, the processor 601 controls and manages an action of the first access network device. Specifically, the processor 601 is configured to support the first access network device in performing an action performed by the first access network device described in the embodiments of this application. The communications interface 604 is configured to support the first access network device in communicating with another network entity, for example, communicating with the first RN. The memory 603 is configured to store program code and data of the first access network device.

When the network device 60 is the first RN, the processor 601 controls and manages an action of the first RN. For example, the processor 601 is configured to support the first RN in performing the steps in FIG. 7 and/or an action performed by the first RN in another process described in the embodiments of this application. The communications interface 604 is configured to support the first RN in communicating with another network entity, for example, communicating with the first access network device. The memory 603 is configured to store program code and data of the first RN.

An embodiment of this application further provides a computer-readable storage medium, including an instruction. When the instruction is run on a computer, the computer is enabled to perform the foregoing methods.

An embodiment of this application further provides a computer program product including an instruction. When the computer program product is run on a computer, the computer is enabled to perform the foregoing methods.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, clearly, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of protection defined by the claims of this application and their equivalent technologies.

What is claimed is:

1. A communications method, comprising:
receiving, by a relay node (RN), a broadcast message from a first access network device, wherein the broadcast message comprises first indication information;
obtaining, by the RN, the first indication information, wherein the first indication information indicates that the RN is allowed to access a cell covered by the first access network device, and the broadcast message further comprises second indication information that indicates a terminal is not allowed to access the cell;
ignoring, by the RN, the second indication information;
initiating, by the RN, random access to the first access network device based on the first indication information;
establishing, by the RN, dual connections to the first access network device and a second access network device; and
sending, by the RN, data from the first access network device and signaling and/or data from the second access network device to the terminal,
wherein the RN that accesses the cell covered by the first access network device is configured to provide a data transmission service for the terminal, and
wherein the first access network device is a base station configured to use a new radio (NR) standard, and the second access network device is a base station configured to use a long term evolution (LTE) standard.

2. The communications method according to claim 1, wherein the first indication information comprises a random access resource to be used by the RN to access the cell covered by the first access network device.

3. The communications method according to claim 1, wherein the first indication information comprises a random access resource to be used by the RN to access the cell covered by the first access network device, and the initiating, by the RN, the random access to the first access network device based on the first indication information comprises:
  initiating, by the RN, random access to the first access network device by the random access resource indicated by the first indication information.

4. A communications apparatus acting as a first access network device in a non-standalone (NSA) network scenario, comprising a processor and a transceiver, wherein:
  the processor is configured to prepare a broadcast message to be sent to a relay node (RN) by the transceiver, wherein the broadcast message comprises first indication information that indicates the RN is allowed to access a cell covered by the communications apparatus, and the broadcast message further comprises second indication information that indicates a terminal is not allowed to access the cell; and
  the transceiver is configured to:
    receive a random access request from the RN; and
    mutually communicate with a second access network device so that the RN is allowed to send data from the first access network device and signaling and/or data from the second access network device to the terminal,
  wherein the first access network device is a base station configured to use a new radio (NR) standard, and the second access network device is a base station configured to use a long term evolution (LTE) standard.

5. The communications apparatus according to claim 4, wherein the first indication information comprises a random access resource to be used by the RN to access the cell covered by the communications apparatus.

6. A communications apparatus acting as a relay node (RN), comprising:
  a transceiver, configured to receive a broadcast message from a first access network device, wherein the broadcast message comprises first indication information; and
  a processor, configured to obtain the first indication information, wherein the first indication information indicates that the RN is allowed to access a cell covered by the first access network device, and the broadcast message further comprises second indication information that indicates a terminal is not allowed to access the cell;
wherein:
the processor is further configured to: ignore the second indication information, and initiate random access to the first access network device based on the first indication information;
the communications apparatus that accesses the cell covered by the first access network device is configured to provide a data transmission service for the terminal;
the transceiver is further configured to:
  establish dual connections to the first access network device and to a second access network device; and
  send data from the first access network device and signaling and/or data from the second network access device to the terminal; and
the first access network device is a base station configured to use a new radio (NR) standard, and the second access network device is a base station configured to use a long term evolution (LTE) standard.

7. The communications apparatus according to claim 6, wherein the first indication information comprises a random access resource to be used by the RN to access the cell covered by the first access network device.

8. The communications apparatus according to claim 6, wherein the first indication information comprises a random access resource to be used by the RN to access the cell covered by the first access network device, and
  wherein when the processor is configured to initiate random access to the first access network device based on the first indication information, the processor is specifically configured to initiate random access to the first access network device based on the random access resource indicated by the first indication information.

* * * * *